United States Patent
Perkinson et al.

(10) Patent No.: US 11,435,111 B2
(45) Date of Patent: Sep. 6, 2022

(54) UNDULATED SURFACE ENHANCEMENT OF DIFFUSER BLADES FOR ROUND AND RECTANGULAR CEILING DIFFUSER

(71) Applicant: Air Distribution Technologies IP, LLC, Milwaukee, WI (US)

(72) Inventors: Ryan M. Perkinson, Plano, TX (US); Gary A. Minor, Flower Mound, TX (US); Mark J. Costello, Plano, TX (US)

(73) Assignee: AIR DISTRIBUTION TECHNOLOGIES IP, LLC, Milwaukee, WI (US)

( * ) Notice: Subject to any disclaimer, the term of this patent is extended or adjusted under 35 U.S.C. 154(b) by 423 days.

(21) Appl. No.: 16/370,376

(22) Filed: Mar. 29, 2019

(65) Prior Publication Data
US 2020/0292202 A1   Sep. 17, 2020

Related U.S. Application Data

(60) Provisional application No. 62/816,647, filed on Mar. 11, 2019.

(51) Int. Cl.
*F24F 13/08* (2006.01)
(52) U.S. Cl.
CPC .................... *F24F 13/08* (2013.01)
(58) Field of Classification Search
CPC .......... F24F 13/08; F24F 13/082; F24F 13/24; F24F 13/081
See application file for complete search history.

(56) References Cited

U.S. PATENT DOCUMENTS

| | | | | |
|---|---|---|---|---|
| 3,177,795 A | * | 4/1965 | Schutt | F24F 13/1413 454/311 |
| 5,411,438 A | * | 5/1995 | White | F24F 13/06 137/601.08 |
| 9,249,666 B2 | * | 2/2016 | Wood | F03D 1/0633 |
| 2005/0271513 A1 | * | 12/2005 | Johann | F01D 5/141 416/236 R |
| 2013/0064675 A1 | * | 3/2013 | Jaquemotte | F03D 1/0675 416/226 |
| 2015/0300372 A1 | | 10/2015 | Stephan et al. | |
| 2017/0226865 A1 | | 8/2017 | Kray et al. | |

FOREIGN PATENT DOCUMENTS

| | | |
|---|---|---|
| EP | 2508815 | 10/2012 |
| JP | 2010286173 | 12/2010 |

OTHER PUBLICATIONS

Trox, GMBH; "Type TJN", 2019; pp. 1-14.

* cited by examiner

*Primary Examiner* — Jessica Yuen
(74) *Attorney, Agent, or Firm* — Fletcher Yoder, P.C.

(57) ABSTRACT

A round or rectangular ceiling diffuser includes a blade. The blade includes a leading edge configured to face an incoming air flow and having an undulated contour extending along a closed-loop formed by the blade. The blade also includes a trailing edge opposite to the leading edge, where a width of the blade extends from the leading edge to the trailing edge and the undulated contour extends into and out of the width.

20 Claims, 8 Drawing Sheets

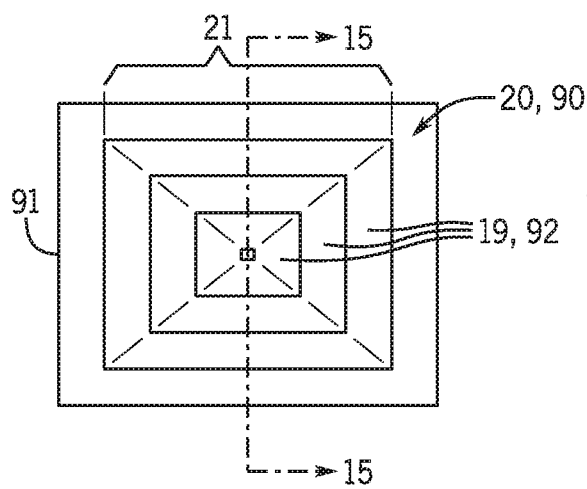
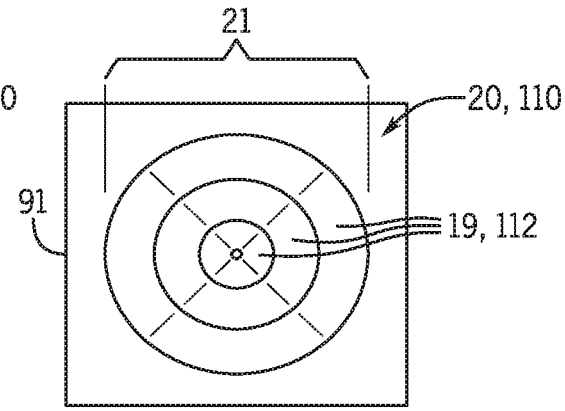
FIG. 11    FIG. 12
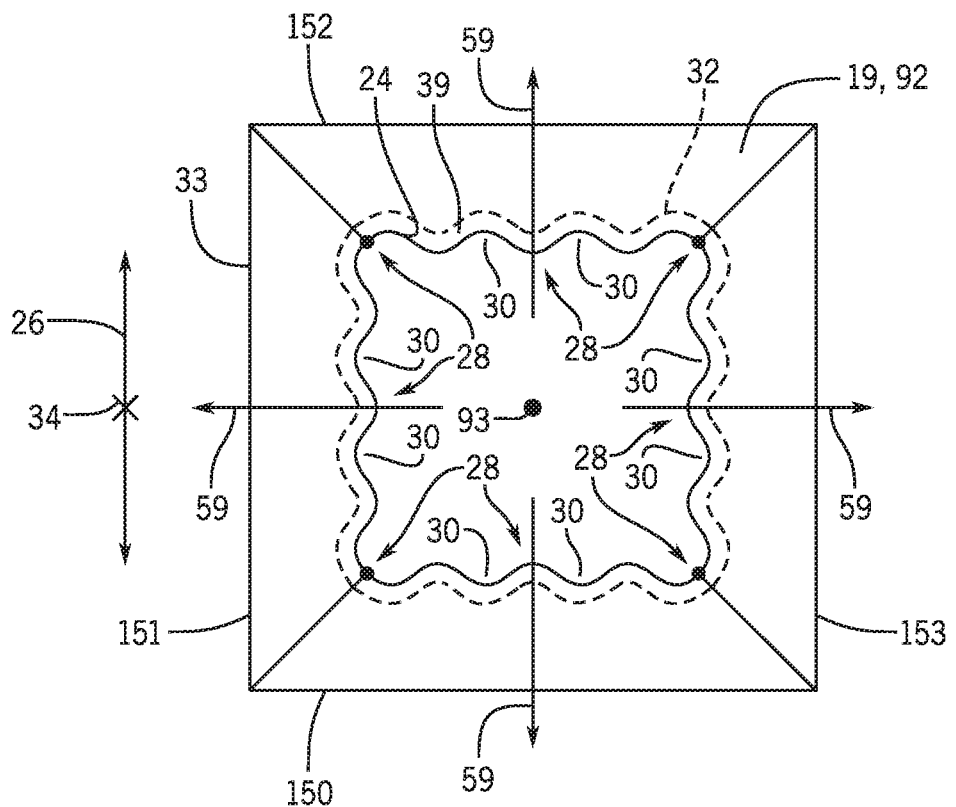
FIG. 13

UNDULATED SURFACE ENHANCEMENT OF DIFFUSER BLADES FOR ROUND AND RECTANGULAR CEILING DIFFUSER

CROSS REFERENCE TO RELATED APPLICATION

This application claims priority from and the benefit of U.S. Provisional Application Ser. No. 62/816,647, entitled "UNDULATED SURFACE ENHANCEMENT OF DIFFUSER BLADES FOR ROUND AND RECTANGULAR CEILING DIFFUSER," filed Mar. 11, 2019, which is hereby incorporated by reference in its entirety for all purposes.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A wide range of applications exist for HVAC systems. For example, residential, light commercial, commercial, and industrial systems are used to control temperatures and air quality in residences and buildings. Generally, HVAC systems may circulate a fluid, such as a refrigerant, through a closed loop between an evaporator coil, where the fluid absorbs heat, and a condenser, where the fluid releases heat. The fluid flowing within the closed loop is generally formulated to undergo phase changes within the normal operating temperatures and pressures of the system, so that quantities of heat can be exchanged by virtue of the latent heat of vaporization of the fluid. A fan or fans may blow air over the coils of the heat exchanger(s) in order to condition the air. In other embodiments, a chiller and boiler may be utilized to cool and heat water, and the above-described fan or fans may blow air over, for example, a conduit which receives the temperature-controlled water. The air may then be routed toward a space, through ductwork, for example, to condition the space.

In certain HVAC systems, a diffuser may operate to diffuse, distribute, or throw a conditioned air flow from a duct into a conditioned space. Certain traditional diffusers may include blades that inefficiently distribute, diffuse, or throw the conditioned air flow to the conditioned space. Certain traditional diffusers may additionally or alternatively include blades that are expensive to manufacture. Thus, it is now recognized that improved diffusers which are cost effective and efficient are desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a round or rectangular ceiling diffuser having a blade. The blade includes a leading edge configured to face an incoming air flow and having an undulated contour extending along a closed-loop formed by the blade. The blade also includes a trailing edge opposite to the leading edge, where a width of the blade extends from the leading edge to the trailing edge and the undulated contour extends into and out of the width.

The present disclosure relates to a ceiling diffuser blade. The ceiling diffuser blade includes a leading edge configured to face an incoming air flow, a width extending from the leading edge to a trailing edge of the ceiling diffuser blade, an undulated contour extending along the leading edge and into and out of the width, and a closed-loop cross-section formed by the blade at a position along the width between the leading edge and the trailing edge.

The present disclosure relates to a diffuser including a closed-loop blade. The closed-loop blade includes a leading edge configured to face an incoming air flow, a trailing edge opposing the leading edge, a width extending from the leading edge to the trailing edge, and an undulated contour extending along the leading edge and into the width toward the trailing edge.

BRIEF DESCRIPTION OF THE DRAWINGS

FIG. 11 is a front view of a rectangular ceiling diffuser for use in the HVAC system of FIG. 2, in accordance with an aspect of the present disclosure;

FIG. 12 is a front view of a round ceiling diffuser for use in the HVAC system of FIG. 2, in accordance with an aspect of the present disclosure;

FIG. 13 is a front view of a rectangular blade for use in the rectangular ceiling diffuser of FIG. 11, in accordance with an aspect of the present disclosure;

DETAILED DESCRIPTION

Figure 1:
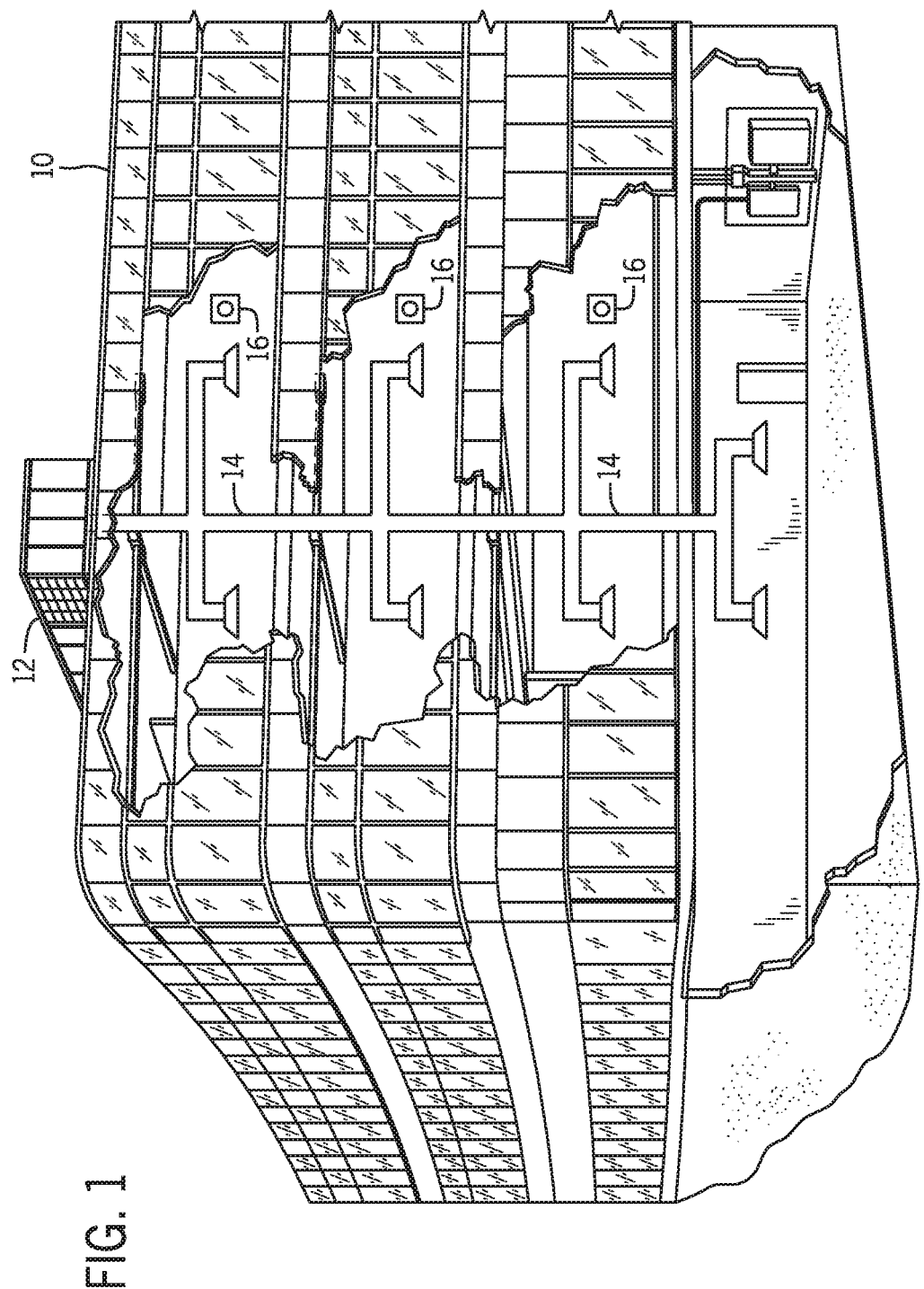
FIG. 1 is a perspective view a heating, ventilation, and/or air conditioning (HVAC) system for building environmental management, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to a heating, ventilation, and/or air conditioning (HVAC) system. More particularly, the present disclosure is directed toward a blade of a diffuser of an HVAC system.

A wide range of applications exist for HVAC systems. For example, residential, light commercial, commercial, and industrial systems are used to control temperatures and air quality in residences and buildings. Generally, HVAC systems may circulate a fluid, such as a refrigerant, through a closed loop between an evaporator coil, where the fluid absorbs heat, and a condenser, where the fluid releases heat. The fluid flowing within the closed loop is generally formulated to undergo phase changes within the normal operating temperatures and pressures of the system, so that quantities of heat can be exchanged by virtue of the latent heat of vaporization of the fluid. A fan or fans may blow air over the coils of the heat exchanger(s) in order to condition the air. In other embodiments, a chiller and boiler may be utilized to cool and heat water, and the above-described fan or fans may blow air over, for example, a conduit which receives the temperature-controlled water. The air may then be routed toward a space, through ductwork, for example, to condition the space.

In certain HVAC systems, a diffuser may operate to diffuse, distribute, or throw a conditioned air flow from a duct into a conditioned space. Certain traditional diffusers may include blades that inefficiently distribute, diffuse, or throw the conditioned air flow to the conditioned space. Certain traditional diffusers may additionally or alternatively include blades that are expensive to manufacture.

In accordance with present embodiments, a diffuser blade may include sheet metal and an undulated surface enhancement along a leading edge of the diffuser blade. For example, the diffuser blade may be formed from sheet metal. Sheet metal fabrication techniques may be performed along the leading edge of the diffuser blade to generate the undulated surface enhancement. The undulated surface enhancement may include a smooth, wave-like contour extending along a length of the leading edge of the diffuser blade. The undulated surface enhancement may also include a smooth, wave-like shape adjacent to the smooth, wave-like contour of the leading edge and at a position along a width of the blade between the leading edge and a trailing edge of the blade, where a curved, tapered, or beveled surface of the blade extends between the undulated contour of the leading edge and the wave-like shape adjacent to the leading edge. The diffuser blade may be arranged in the diffuser such that the leading edge of the diffuser blade faces an incoming air flow when the diffuser is installed for operation in the HVAC system. The undulated surface enhancement described above may operate to reduce a pressure drop in the air flow passing thereover relative to traditional embodiments not having the undulated surface enhancement. That is, the undulated surface enhancement may reduce an impact of the diffuser blade on a pressure and/or velocity profile of the air flow passing through the diffuser and into the conditioned space. By improving pressure and velocity profiles relative to traditional embodiments, a power needed to operate a blower or fan that moves the air flow to and through the diffuser may be reduced.

Further, in addition to reducing the pressure drop as described above, presently disclosed diffuser blades having the undulated surface enhancement along the leading edge thereof may reduce a noise caused by the air flow passing over the diffuser blade, relative to traditional embodiments, and/or caused by the fan utilized to move the air flow to and through the diffuser. The presently disclosed undulated surface enhancement along the diffuser blade's leading edge may be employed for diffuser blades of plenum slot diffusers, linear bar diffusers, and ceiling diffusers. The presently disclosed diffuser blades, which are formed from sheet metal and include the undulated surface enhancement along the leading edge of the diffuser blade, may be cost effective and may improve an efficiency of the diffuser blade for the above-described reasons. These and other features will be described in detail below with reference to the drawings.

Turning now to the drawings, FIG. 1 illustrates a heating, ventilation, and/or air conditioning (HVAC) system for building environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single, packaged unit containing other equipment, such as a blower, integrated air handler, and/or auxiliary heating unit. In other embodiments, the HVAC unit 12 may be part of a split HVAC system, which includes an outdoor HVAC unit and an indoor HVAC unit.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

It should be appreciated that any of the features described herein may be incorporated with the HVAC unit 12, residential heating and cooling systems, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Further, in accordance with an aspect of the present disclosure, a diffuser may be employed to diffuse, distribute, or throw a conditioned air flow from the ductwork 14 and into a conditioned space. Certain traditional diffusers may include blades that inefficiently distribute, diffuse, or throw the conditioned air flow to the conditioned space. Certain traditional diffusers may additionally or alternatively include blades that are expensive to manufacture. The diffuser described herein may include a diffuser blade fabricated from sheet metal and having an undulated surface enhancement along a leading edge of the blade 19. The undulated surface enhancement may include, for example, a smooth, wave-like contour of a leading edge of the blade 19, extending along a length of the blade 19. Additionally, a wave-like shape may extend along the length of the blade adjacent to the wave-like contour of the leading edge, and a curved, tapered, or beveled surface may extend from the wave-like contour of the leading edge to the wave-shape adjacent the leading edge. By fabricating the diffuser blade 19 from sheet metal, as noted above, a cost of the diffuser blade 19 may be maintained and/or improved over traditional embodiments. Further, by fabricating the diffuser blade 19 to include the undulated surface enhancement along the leading edge, air flow velocity and/or pressure may be improved over traditional embodiments. These and other features will be described in detail below.

Figure 2:
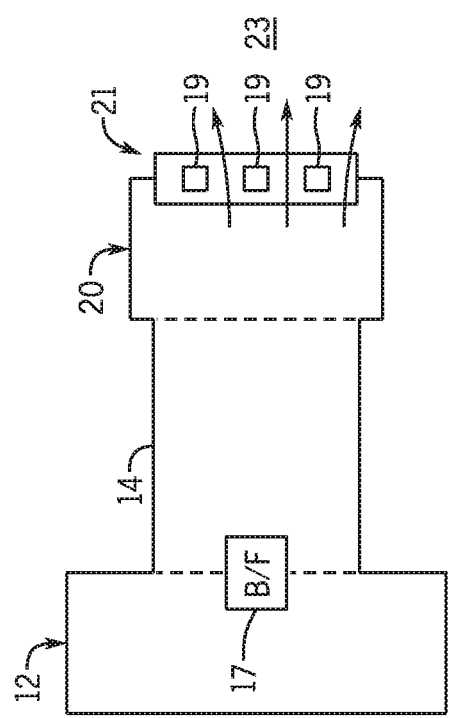
FIG. 2 is a schematic illustration of the HVAC system of FIG. 1 having a diffuser, in accordance with an aspect of the present disclosure.

FIG. 2 is schematic illustration of an embodiment of the HVAC system of FIG. 1 having a diffuser 20. In the illustrated embodiment, the HVAC unit 12 may operate to condition an air flow, and the ductwork may operate to route the air flow from the HVAC unit 12 to the diffuser 20. The illustrated embodiment is schematic and omits specific componentry utilized to condition the air flow. However, it should be appreciated that any one or more of an evaporator, a condenser, a chiller, a boiler, a furnace, an economizer, or any other suitable heat exchange device or assembly may be employed in the HVAC unit 12 and/or in an intervening component(s) between the HVAC unit 12 and the diffuser 20 to condition the air flow. Further, one or more air movers 17, such as a blower or fan, may be employed to move the air flow between the HVAC unit 12 and the diffuser 20. For example, the air mover(s) 17 may be disposed in the HVAC unit 12, in the duct 14, or both.

The diffuser 20 in the illustrated embodiment includes a blade section 21 having blades 19 disposed therein. In some embodiments, as will be appreciated in view of later drawings and corresponding description, only one blade 19 may be employed. The blade(s) 19 of the blade section 21 may be configured to diffuse, distribute, or throw the air flow from the diffuser 20 and to a conditioned space 23. In accordance with present embodiments, each blade 19 of the blade section 21 may include an undulated surface enhancement along a leading edge thereof, which operates to improve a velocity and/or pressure profile of the air flow relative to traditional embodiments. For example, the leading edge of each blade of the blade section 21 may generally impede the air flow through the blade section 21. By including the presently disclosed undulated surface enhancement along the leading edge, the degree of impedance may be reduced and/or controlled to improve a velocity or pressure profile of the air flow passing through the blade section 21. That is, the undulated surface enhancement along the leading edge of each blade in the blade section 21 may improve diffusing, the distribution, or the throw of the air flow from the blade section 21 and into the conditioned space 23 by the diffuser 20. It should be noted that the presently disclosed undulated surface enhancement along the leading edge of the blade may be employed for several different types of diffusers having different types of blades, such as linear bar diffusers, plenum slot diffusers, and ceiling diffusers. Certain diffuser embodiments include multiple blades in the blade section 21, while certain other diffuser embodiments include only a single blade in the blade section 21. Further, particular geometry of the blades may depend on the type of diffuser employed. Examples of the different types of diffusers and corresponding diffuser blades are described in detail below with reference to FIGS. 3-15.

Figure 3:
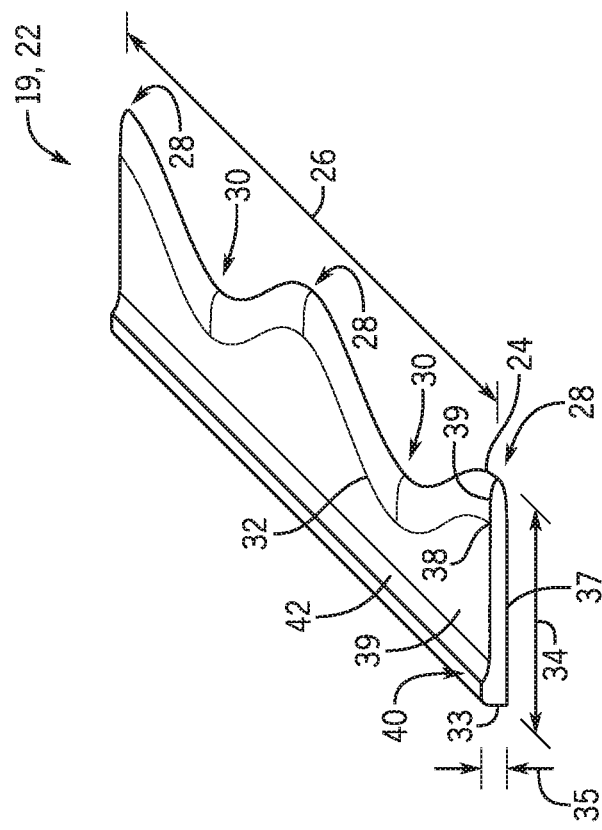
FIG. 3 is a perspective view of a blade for use in the diffuser of FIG. 2, in accordance with an aspect of the present disclosure.

FIG. 3 is a perspective view of an embodiment of a blade 19 for use in the blade section 21 of the diffuser 20 of FIG. 2, in particular a linear bar diffuser blade 22. The linear bar diffuser blade 22 includes a leading edge 24 extending along a length 26 of the linear bar diffuser blade 22. The leading edge 24 generally includes an undulated contour on the leading edge 24 and extending along the length 26 of the linear bar diffuser blade 22. More specifically, the leading edge 24 includes a smooth, wave-like contour which operates to reduce a pressure drop caused by the linear bar diffuser blade 22 relative to traditional embodiments. The leading edge 24 in the illustrated embodiment is defined by several peaks 28 and valleys 30 forming the smooth, wave-like surface or contour. For example, the illustrated linear bar diffuser blade 22 includes three peaks 28 and two valleys 30, where each peak 28 is separated from an adjacent peak 28 by one of the valleys 30, and where each valley 30 is separated from an adjacent valley 30 by one of the peaks 28. Each peak 28 is similarly shaped in the illustrated embodiment, and each valley 30 is similarly shaped in the illustrated embodiment. The peaks 28 and valleys 30 are joined to form a smooth, wave-like contour, as opposed to more rigid or abrupt features such as a saw-tooth contour and/or triangular teeth contour. The leading edge 24 in accordance with the description above may be referred to as an undulated contour. It should be understood that the smooth, wave-like surface, or undulated contour, of the leading edge 24 does not necessarily imply that the shape of the leading edge 24 is defined by a particular mathematical equation or function, but instead excludes embodiments having sharp or jagged segments, such as a saw-tooth.

The linear bar diffuser blade 22 includes a width 34 extending from the leading edge 24 and to a trailing edge 33 of the linear bar diffuser blade 22. The previously described peaks 28 and valleys 30, which are joined to form the undulated contour extending along the length 26 of the linear bar diffuser blade 22, extend into the width 34 of the linear bar diffuser blade 22 as shown. Further, the linear bar diffuser blade 22 includes a height 35. In the illustrated embodiment, the height 35 generally extends from a bottom surface 37 to an upper surface 41 of the linear bar diffuser blade 22. As shown, the bottom surface 37 of the linear bar diffuser blade 22 generally includes a flat segment extending along a majority, or entirety, of the linear bar diffuser blade 22. Further, as shown, a wave shape 32 corresponding to the undulated contour of the leading edge 24 may extend along the length 26 of the linear bar diffuser blade 22 and at a location 38 along the width 34 between the leading edge 24 and the trailing edge 33. The wave shape 32 may correspond in shape to the undulated contour of the leading edge 24. A curved segment 39 of the upper surface 41 of the linear bar diffuser blade 22 along the width 34 and between the leading edge 24 and the location 38 may connect the undulated contour of the leading edge 24 with the wave shape 32. As shown, the wave shape 32 is disposed on the upper surface 41 of the linear bar diffuser blade 22, and another instance of the wave shape may also be disposed on the bottom surface 37 of the linear bar diffuser blade 22. In some embodiments, the wave shape 32 may be a contour, bevel, thinning or other transition. For example, the wave shape 32 may be a sharpening toward the leading edge 24. Further, this transition may occur across the entire width of the linear bar diffuser blade 22 or at any of various locations with different shapes (e.g., not the wave shape 32), including a straight line across a middle portion between the leading edge 24 and trailing edge 33. In some embodiments, the transition from the undulated contour of the leading edge 24 to the wave shape 32 adjacent the leading edge 24 may be referred to as a rounded or beveled edge. That is, the leading edge 24 having the undulated contour may be beveled or rounded to the wave shape 32, which together form the undulated surface enhancement.

It should be noted that the undulated contour of the leading edge 24, the wave shape 32, and the curved segment 39 of the top surface 41 extending between the undulated contour of the leading edge 24 and the wave shape 32 may be formed by sheet metal fabrication techniques, such as bending, blanking, cutting, die cutting, finishing, milling, roll forming, and/or other suitable sheet metal fabrication techniques. In certain embodiments, the linear bar diffuser blade 22 also includes a lip 40 extending upwardly and adjacent to the trailing edge 33. An additional curved segment 42 of the linear bar diffuser blade 22, extending along the width 34 of the linear bar diffuser blade 22 and adjacent to the lip 40, may at least partially define the lip 40. The above-described sheet metal fabrication techniques may also be employed to generate the lip 40. The lip 40 may operate to reduce a cross-sectional distance between adjacent linear bar diffuser blades 22 stacked one on top of another, as described below with reference to FIGS. 4 and 5.

Figure 4:
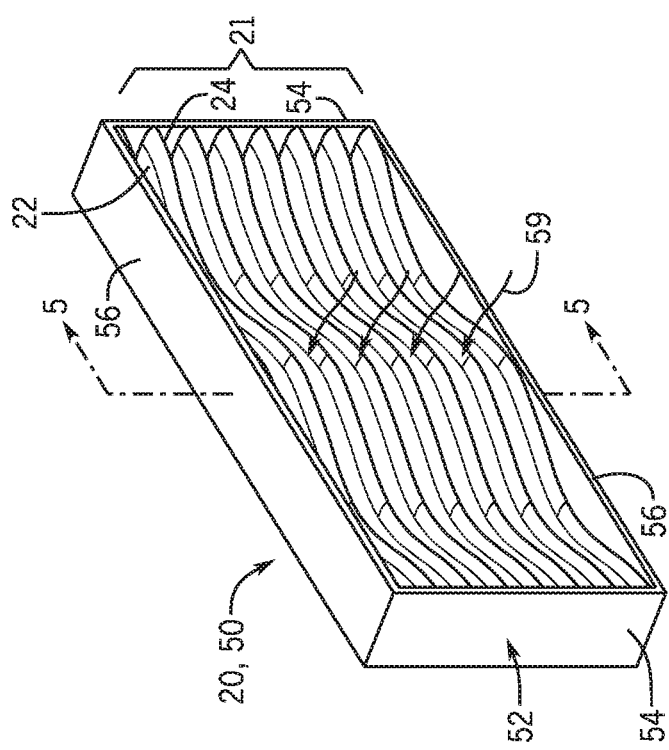
FIG. 4 is a perspective view of a linear bar diffuser having the blade of FIG. 3, in accordance with an aspect of the present disclosure.

FIG. 4 is a perspective view of an embodiment of a diffuser 20, for example a linear bar diffuser 50, in which the linear bar diffuser blade 22 of FIG. 3 is employed. As shown, several linear bar diffuser blades 22 may be employed in the blade section 21 of the linear bar diffuser 50. While seven linear bar diffuser blades 22 are shown in the illustrated embodiment, more or fewer than seven linear bar diffuser blades 22 may be included. The linear bar diffuser blades 22 in the illustrated embodiment are disposed in a grille 52 formed by side walls 54 and end walls 56 forming a perimeter, such as a rectangular perimeter, extending around the blade section 21. In some embodiments, the linear bar diffuser blades 22 may be fixed to the side walls 54. In other embodiments, the linear bar diffuser blades 22 may be movable to change an incidence angle relative to an incoming air flow 59. Further, in some embodiments, the grille 52 may include only the end walls 56, and the linear bar diffuser blades 22 may be rigidly or movably coupled to features other than the illustrated side walls 54.

Figure 5:
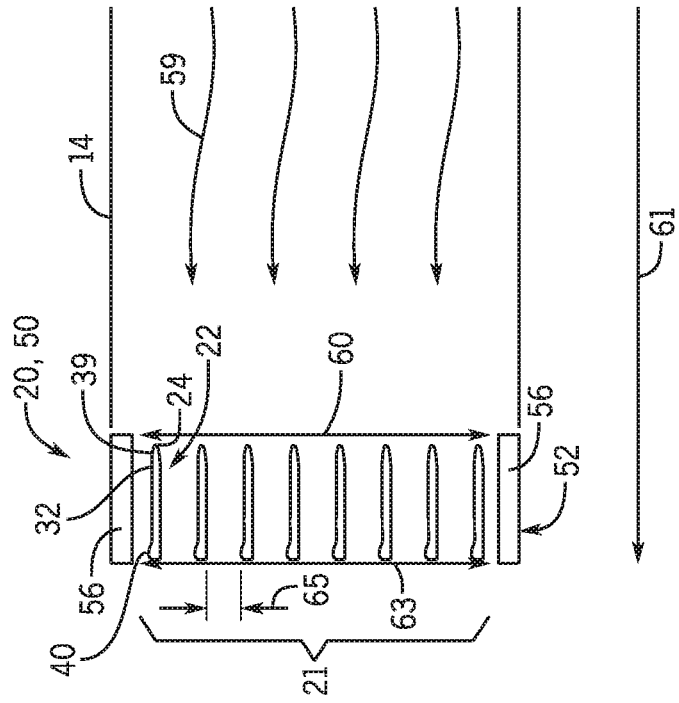
FIG. 5 is a cross-sectional side view of the linear bar diffuser of FIG. 4, taken along line 5-5 in FIG. 4, in accordance with an aspect of the present disclosure.

As shown, the incoming air flow 59 may approach the leading edges 24 of the linear bar diffuser blade 22, and the leading edges 24, which include the features illustrated in FIG. 3 and described above, may reduce pressure drop and noise caused by traditional blade embodiments not having the features illustrated in FIG. 3 and described above. FIG. 5 is a cross-sectional side view of an embodiment of the linear bar diffuser 50 of FIG. 4, taken along line 5-5 in FIG. 4, and coupled to ductwork 14. As shown, the grille 52, which includes the end walls 56 defining the blade section 21, of the linear bar diffuser 50 may be directly coupled to the ductwork 14 such that an inlet 60 to the blade section 21 directly receives the incoming air flow 59 from the ductwork 14. That is, the air flow 59 may enter the linear bar diffuser 50 through the inlet 60 and directly pass over and between the linear bar diffuser blade 22, without substantial redirection of the air flow 59. Put differently, a general direction of travel 61 of the air flow 59 may be the same through the duct 14 and through the linear bar diffuser 50. This may be contrasted with a plenum slot diffuser having an inlet on one side of the plenum slot diffuser and having an outlet on a transverse side of the plenum slot diffuser, causing the air flow to bend from the inlet to the outlet, which will be shown, and described with respect to, later drawings below.

The air flow 59 in the embodiment illustrated in FIG. 5 may pass over the leading edges 24 of the linear bar diffuser blade 22 and between adjacent linear bar diffuser blades 22 of the blade section 21 of the linear bar diffuser 50. The leading edge 24 may include the undulated contour shown in FIG. 3 and described above, and the linear bar diffuser blade 22 may include the wave shape 32 corresponding in shape to the undulated contour of the leading edge 24 and coupled to the undulated contour of the leading edge 24 via the curved segment 39 of the upper surfaced 41 of the linear bar diffuser blade 22. These and other features of the linear bar diffuser blade 22 may facilitate a reduction in a pressure drop and/or noise in the air flow 59 caused by the linear bar diffuser blade 22. The reduced pressure drop may improve a distribution or throw of the air flow 59 to a conditioned space. Further, the lips 40 of the linear bar diffuser blades 22 may be disposed adjacent an outlet 63 of the linear bar diffuser 50. The lips 40 may operate to reduce a distance 65 between adjacent linear bar diffuser blades 22, causing an air flow restriction that operates to accelerate the air flow 59 through the outlet 63 and into the conditioned space.

Figure 7:
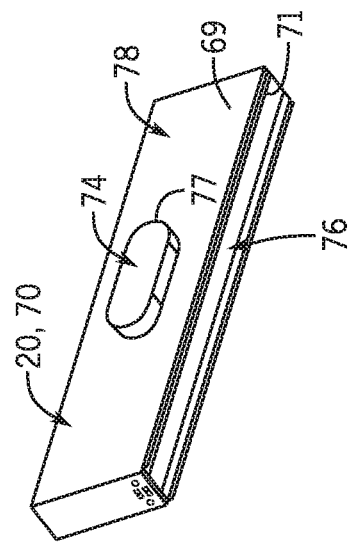
FIG. 7 is a perspective view of a plenum slot diffuser having the blade of FIG. 6, in accordance with an aspect of the present disclosure.
Figure 6:
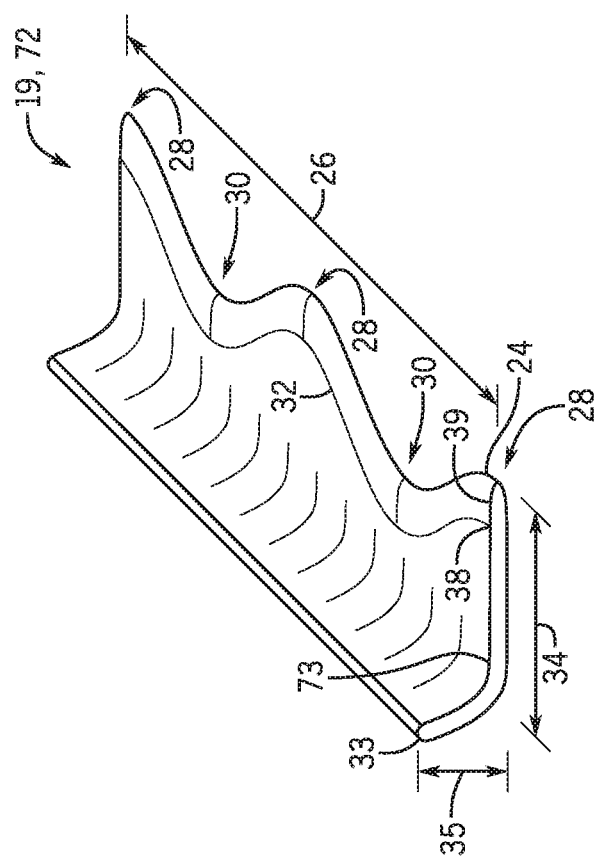
FIG. 6 is a perspective view of a blade for use in the diffuser of FIG. 2, in accordance with an aspect of the present disclosure.

Other types of blades and diffusers may also be employed in accordance with the present disclosure. For example, FIG. 6 is a perspective view of an embodiment of the blade 19, in particular a plenum slot diffuser blade 72, for use in the diffuser 20 of FIG. 2, in particular a plenum slot diffuser 70 as illustrated in FIG. 7. In the embodiment illustrated in FIG. 6, the plenum slot diffuser blade 72 includes the leading edge 24 extending along the length 26 of the plenum slot diffuser blade 72. The leading edge 24 generally includes an undulated contour on the leading edge 24 and extending along the length 26. More specifically, the leading edge 24 includes a smooth, wave-like contour which operates to reduce a pressure drop caused by the plenum slot diffuser blade 72 relative to traditional embodiments. The leading edge 24 in the illustrated embodiment is defined by several peaks 28 and valleys 30 forming the smooth, wave-like surface. For example, the illustrated plenum slot diffuser blade 72 includes three peaks 28 and two valleys 30, where each peak 28 is separated from an adjacent peak 28 by one of the valleys 30, and where each valley 30 is separated from an adjacent valley 30 by one of the peaks 28. The peaks 28 and valleys 30 are joined to form a smooth, wave-like surface, as opposed to more rigid or abrupt features such as a saw-tooth contour and/or triangular teeth contour. The leading edge 24 in accordance with the description above may be referred to as an undulated contour. It should be understood that the smooth, wave-like surface, or undulated contour, of the leading edge 24 does not necessarily imply that the shape of the leading edge 24 is defined by a particular mathematical equation or function, but excludes embodiments having sharp or jagged segments, such as a saw-tooth.

The plenum slot diffuser blade 72 also includes the width 34 extending from the leading edge 24 and to a trailing edge 33 of the plenum slot diffuser blade 72. The plenum slot diffuser blade 72, as shown, may be curved along the width 34 upwardly or downwardly in the height 35 direction. As shown, the wave shape 32 corresponding to the undulated contour of the leading edge 24 may extend along the length 26 of the plenum slot diffuser blade 72 and at the location 38 along the width 34 between the leading edge 24 and the trailing edge 33. The wave shape 32 may correspond in shape to the undulated contour of the leading edge 24. The curved segment 39 of the upper surface 41 of the plenum slot diffuser blade 72 along the width 34 and between the leading edge 24 and the location 38 may connect the undulated contour of the leading edge 24 with the wave shape 32. It should be noted that the undulated contour of the leading edge 24, the wave shape 32, and the curved segment 39 of the upper surface 41 extending between the undulated contour of the leading edge 24 and the wave shape 32 may be formed by sheet metal fabrication techniques, such as bending, blanking, cutting, die cutting, finishing, milling, roll forming, and/or other suitable sheet metal fabrication techniques. As shown, and as briefly described above, the plenum slot diffuser blade 72 includes a curved profile 73 extending along the width 34 of the plenum slot diffuser blade 72, for example curving upwardly to increase the height 35 of the plenum slot diffuser blade 72. The curved profile 73 may extend along at least half of the width 34 of the plenum slot diffuser blade 72, which may distinguish the plenum slot diffuser blade 72 from the linear slot diffuser blade 22 of FIG. 3 in certain embodiments.

FIG. 7 is a perspective view of an embodiment of the plenum slot diffuser 70, which may include the plenum slot diffuser blade 72 of FIG. 6. Although the plenum slot diffuser blade 72 is not illustrated in FIG. 7 because it is internal to the illustrated plenum slot diffuser 70, it should be appreciated that the plenum slot diffuser 70 of FIG. 7 may include the plenum slot diffuser blade 72 of FIG. 6 or another blade 19 in accordance with the present disclosure. As shown in FIG. 7, the plenum slot diffuser 70 includes an air flow inlet 74 configured to be coupled to ductwork, and an air flow outlet 76. The air flow inlet 74 may be defined by a flange 77 extending from an inlet side 69 of a body 78 of the plenum slot diffuser 70. The air flow outlet 76 may be formed in a different, outlet side 71 of the body 78 of the plenum slot diffuser 70. The inlet side 69 and the outlet side 71 of the body 78 of the plenum slot diffuser 70 may extend transverse to one another. Thus, the air flow may be received at the air flow inlet 74 in a lateral direction and routed or redirected downwardly toward the air flow outlet 76. That is, in the plenum slot diffuser 70, the air flow may bend from the air flow inlet 74 toward the air flow outlet 76, as opposed to the nature of the air flow described with respect to the linear bar diffuser 50 of FIGS. 4 and 5. A blade or blades, for example the plenum slot diffuser blade 72 of FIG. 6, may be disposed in or adjacent to the air flow outlet 76 of the plenum slot diffuser 70 of FIG. 7, and may operate to diffuser, distribute, or throw the air flow into a conditioned space.

Figure 10:
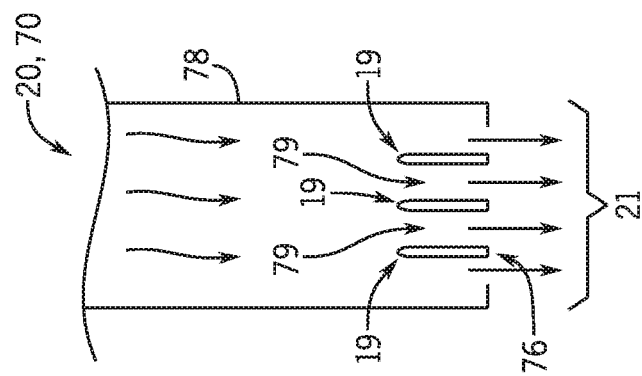
FIG. 10 is a cross-sectional view of a plenum slot diffuser for use in the HVAC system of FIG. 2, in accordance with an aspect of the present disclosure.
Figure 9:
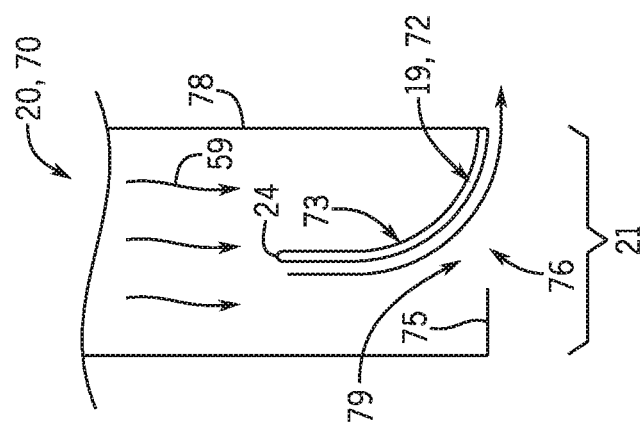
FIG. 9 is a cross-sectional view of a plenum slot diffuser having the blade of FIG. 6, in accordance with an aspect of the present disclosure.
Figure 8:
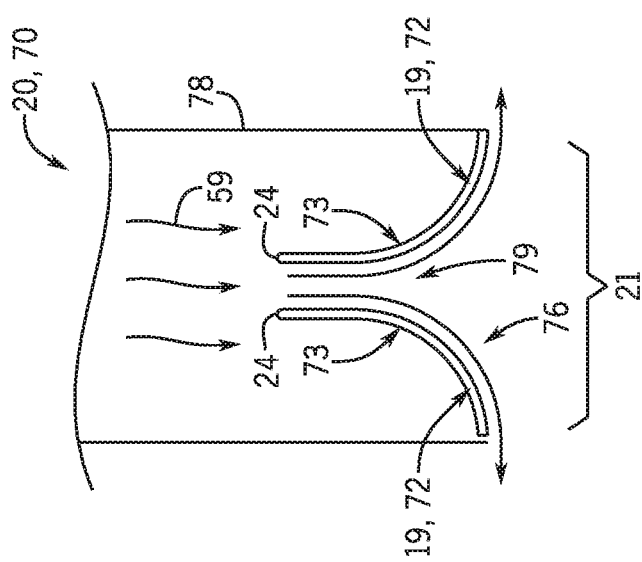
FIG. 8 is a cross-sectional view of a plenum slot diffuser having two of the blades of FIG. 6, in accordance with an aspect of the present disclosure.

Cross-sectional views of embodiments of the plenum slot diffuser 70 are shown in FIGS. 8-10. FIG. 8 is a cross-sectional view of the plenum slot diffuser 70 having two of the plenum slot diffuser blades 72. As shown, the plenum slot diffuser blades 72 include the leading edges 24 facing the incoming air flow 59. In the illustrated embodiment, the plenum slot diffuser blades 72 are arranged in the plenum slot diffuser 70 such that the curved profiles 73 curve outwardly from an air flow path 59 extending between the two plenum slot diffuser blades 72. FIG. 9 is a cross-sectional view of the plenum slot diffuser 70 having only one of the plenum slot diffuser blades 72. In FIG. 9, the air flow path 79 through the air flow outlet 76 is defined at least in part by an underside wall 75 of the body 78 of the plenum slot diffuser 70. The curved profile 73 curves away from the underside wall 75 of the body 78 of the plenum slot diffuser 70. FIG. 10 is a cross-sectional view of the plenum slot diffuser 70 in which a different plenum slot-type blade 72 is employed. For example, the blades 19 in the illustrated embodiment do not include the curved profile 73 illustrated in FIGS. 6, 8, and 9, but instead include respective straight bodies. The blade 19 in FIG. 10 does not include the lip 40 illustrated in FIG. 3 and relating to the linear bar diffuser blade 22 of FIG. 3. Further, as described above with respect to FIG. 7, a general air flow travel direction of the air flow may be redirected from the inlet of the plenum slot diffuser 70 toward the outlet 76.

Still other types of blades and diffusers may be employed in accordance with the present disclosure. For example, FIG. 11 is a front view of an embodiment of a diffuser 20, in particular a rectangular ceiling diffuser 90, for use in the HVAC system of FIG. 2. FIG. 12 is a front view of an embodiment of a diffuser 20, in particular a round ceiling diffuser 110, for use in the HVAC system of FIG. 2. The rectangular ceiling diffuser 90 of FIG. 11 may include diffuser blades 19, in particular rectangular ceiling diffuser blades 92. The round ceiling diffuser 110 of FIG. 12 may also include diffuser blades 19, in particular round ceiling diffuser blades 112. In both embodiments, the diffuser 20 may be installed in, for example, a ceiling tile 91. The blades 19 may be coupled to a duct disposed on an opposing side of the ceiling tile 91.

Figure 14:
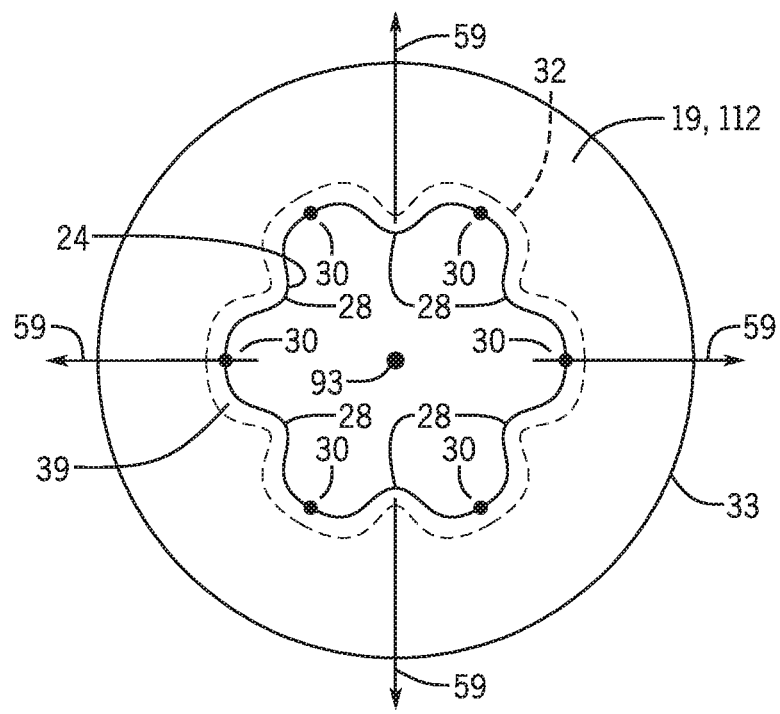
FIG. 14 is a front view of a round blade for use in the round ceiling diffuser of FIG. 12, in accordance with an aspect of the present disclosure.

FIG. 13 is a front view of an embodiment of a blade 19, in particular a rectangular ceiling diffuser blade 92, for use in the rectangular ceiling diffuser 90 of FIG. 11. FIG. 14 is a front view of an embodiment of a blade 19, in particular a round ceiling diffuser blade 112, for use in the round ceiling diffuser of FIG. 12. As illustrated in FIGS. 11 and 12, multiple blades 19 may be employed, and an air flow may travel between adjacent blades 19. As illustrated in FIGS. 13 and 14, the air flow 59 may travel outwardly from a center point 93 about which the blade 19 extends and along surfaces of the blade 19. As shown in FIGS. 13 and 14, the leading edge 24 may form a closed-loop. Further, the leading edge 24 may include the aforementioned undulated contour, defined by the various peaks 28 and valleys 30, and the blade 19 may include the aforementioned wave shape 32 on the body of the blade 19 (e.g., between the leading edge 24 and the trailing edge 33) corresponding in shape to the undulated contour. The aforementioned curved segment 39 of the upper surface 41 may extend between the leading edge 24 and the wave shape 32. In the rectangular embodiment illustrated in FIG. 13, it should be noted that each side 150, 151, 152, 153 of the four sides of the rectangle joined to form the rectangular ceiling diffuser 90 may include, along the leading edge 24, a separate undulated contour from the other sides, in addition to separate corresponding wave shapes 32. That is, the leading edge 24 of the rectangular ceiling diffuser blade 92 may include four different undulated contours, one for each side of the rectangular ceiling diffuser blade 92, and four different wave shapes 32 of the rectangular ceiling diffuser blade 92, one for each side of the rectangular ceiling diffuser blade 92. In other words, in some embodiments, the wave shapes 32 of each side of the rectangular ceiling diffuser blade 92 may not be continuously joined to form a single smooth, continuous wave extending about all four sides of the rectangle. As previously described, the undulated contour of the leading edge 24 extends along the length 26 of the rectangular ceiling diffuser blade 92 and into the width 34 of the rectangular ceiling diffuser blade 92. Details generally regarding the leading edge 24 and the wave shape 32, including the undulated contour, are described above with reference to FIGS. 3-10.

Figure 15:
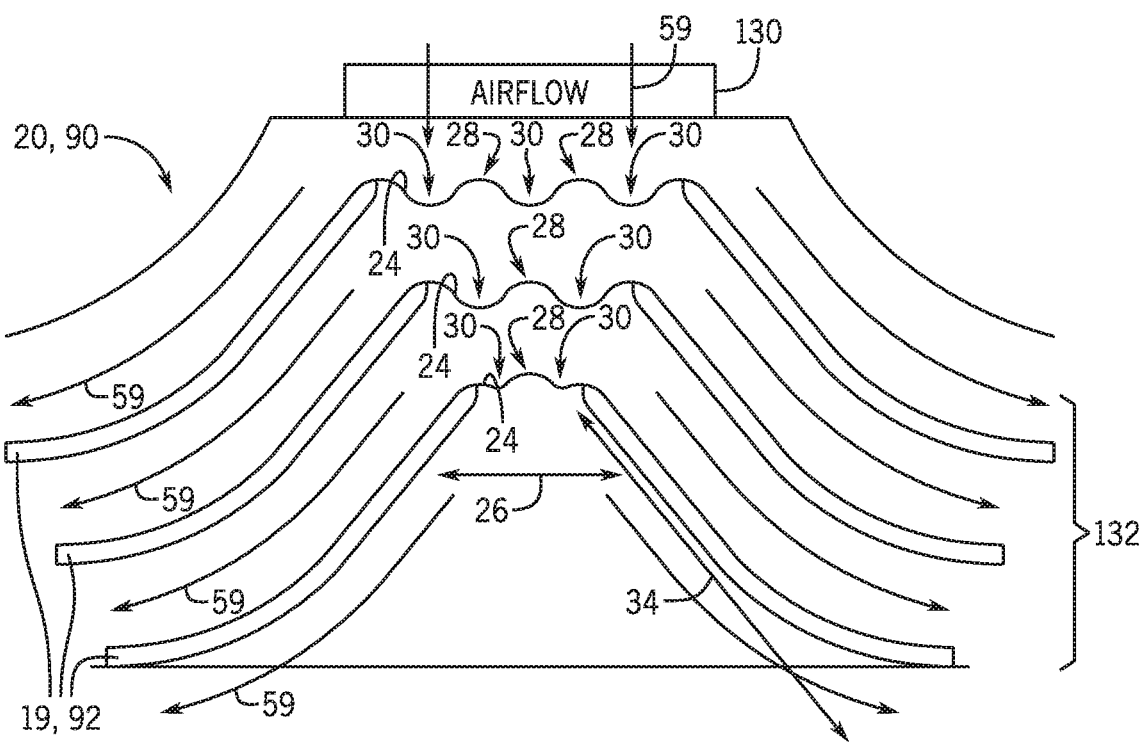
FIG. 15 is a cross-sectional view of the rectangular ceiling diffuser of FIG. 11, taken along line 15-15 in FIG. 11, in accordance with an aspect of the present disclosure.

To further illustrate certain of the above-described features, FIG. 15 is a cross-sectional view of the rectangular ceiling diffuser 90 of FIG. 11, taken along line 15-15 in FIG. 11. As shown, the rectangular ceiling diffuser 90 includes an inlet 130 configured to receive the air flow 59. In certain embodiments, the inlet 130 may be configured to couple directly to a duct, or to an adapter between the duct and the rectangular ceiling diffuser 90. The air flow 59 may travel through the inlet 130 and toward the rectangular ceiling diffuser blades 92. Leading edges 24 of the rectangular ceiling diffuser blades 92 may include the undulated contour, or wave-like contour, having the peaks 28 and the valleys 30 smoothly and continuously joined, as previously described. As shown, the undulated contour of the leading edge 24 extends along the length 26 of each side of the four sides of the rectangular ceiling diffuser blade 92, and into the width 34 of each side of the four sides of the rectangular ceiling diffuser blade 92. The air flow 59 may travel downwardly and/or between adjacent rectangular ceiling diffuser blades 92. The leading edges 24, as previously described, operate to reduce an undesired pressure and/or velocity reduction, and to mitigate noise caused by the rectangular ceiling diffuser 90. After passing between adjacent rectangular ceiling diffuser blades 92, the air flow 59 may be distributed through an air flow outlet 132 of the rectangular ceiling diffuser 90 and into a conditioned space. As shown, the air flow outlet 132 may include several sections corresponding to the space between adjacent blades 19.

Figure 16:
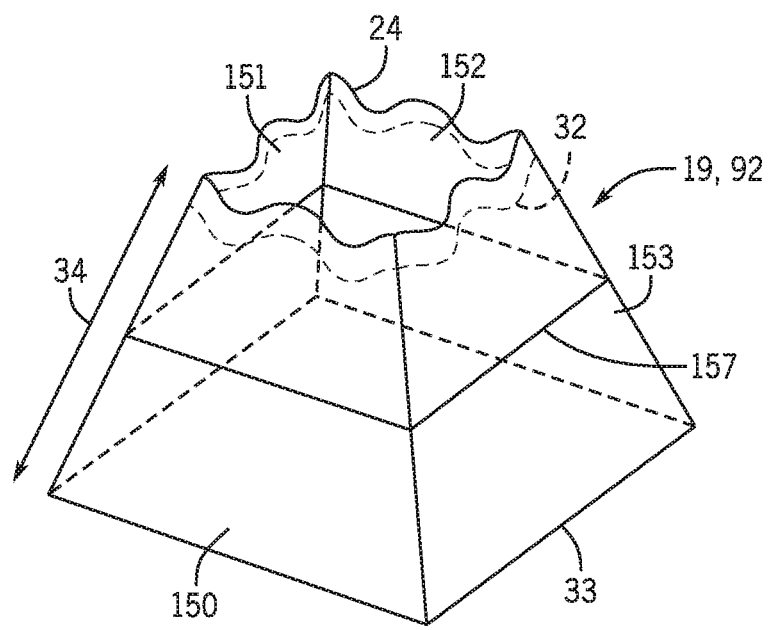
FIG. 16 is a perspective view of a rectangular blade for use in the rectangular ceiling diffuser of FIG. 11 and forming a rectangular frustum, in accordance with an aspect of the present disclosure.
Figure 17:
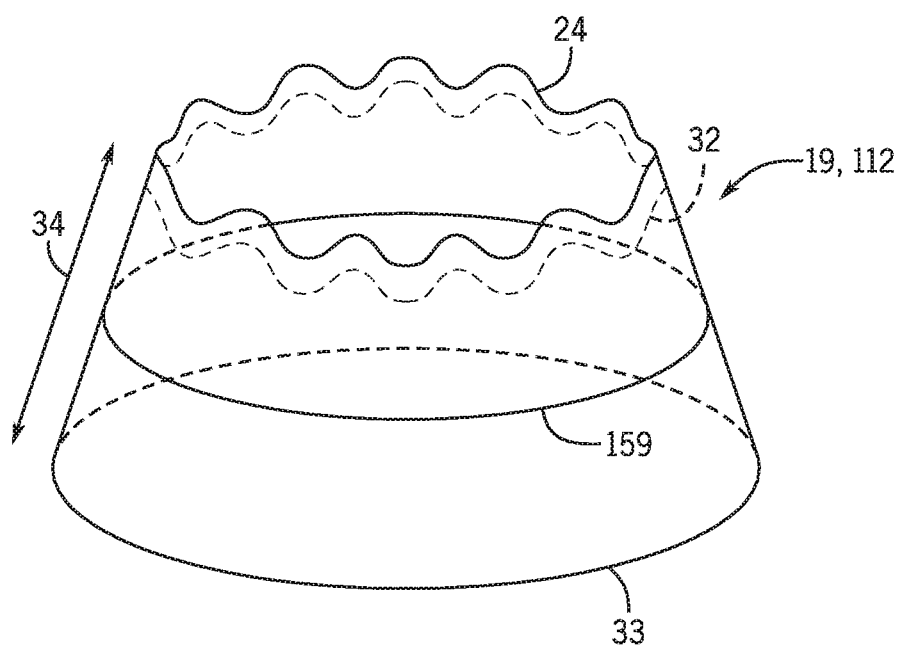
FIG. 17 is a perspective view of a round blade for use in the round ceiling diffuser of FIG. 12 and forming a conical frustum, in accordance with an aspect of the present disclosure.

Perspective views of embodiments of the rectangular ceiling diffuser blade 92 and the round ceiling diffuser blade 112 are illustrated in FIGS. 16 and 17. Focusing first on FIG. 16, as previously described, the rectangular ceiling diffuser blade 92 may include first, second, third, and fourth segments 150, 151, 152, 153 joined to form the rectangular ceiling diffuser blade 92. That is, the first, second, third, and fourth segments 150, 151, 152, 153 are joined in a closed-loop forming the rectangular ceiling diffuser blade 92. For example, the first segment 150, the second segment 151, the third segment 152, and the fourth segment 153 may form a rectangular frustum, having a rectangular cross-section 157 at a position along the width 34 of the rectangular ceiling diffuser blade 92. The rectangular cross-section 157, as previously described, is a closed-loop. Further, as used herein, "rectangular frustum" should not be interpreted as importing strict mathematical limitations regarding a plane intersecting a rectangular prism to form the frustum, as the leading edge 24 of the rectangular ceiling diffuser blade 112 includes the undulated contour. Further, it should be noted that, while the segments 150, 151, 152, 153 forming the rectangular frustum in the illustrated embodiment are substantially straight or flat, in another embodiment, the segments 150, 151, 152, 153 may be graduated or tapered from the leading edge 24 to the trailing edge 33, for example as illustrated in FIG. 15. That is, the rectangular frustum may include a graduated or tapered rectangular frustum in which each segment 150, 151, 152, 153 of the rectangular ceiling diffuser blade 92 is curved or flares outwardly from the leading edge 24 to the trailing edge 33, as shown in the cross-section of FIG. 15.

Focusing now on FIG. 17, the round ceiling diffuser blade 112 in the illustrated embodiment forms a conical frustum having a round or circular cross-section 159 at a position along the width 34 of the round ceiling diffuser blade 112. The circular cross-section 159, as previously described, is a closed-loop. "Conical frustum" as used herein should not be interpreted to import strict mathematical limitations regarding a plane intersecting a cone to form the frustum, as the leading edge 24 of the round ceiling diffuser blade 112 includes the undulated contour. Further, it should be noted that, while the conical frustum of the round ceiling diffuser blade 112 in the illustrated embodiment does not flare or curve outwardly from the leading edge 24 to the trailing edge 33, in other embodiments, the round ceiling diffuser blade 112 may be graduated or tapered from the leading edge 24 to the trailing edge 33, for example as illustrated in FIG. 15. That is, the conical frustum may include a graduated or tapered conical frustum in which the round ceiling diffuser blade 112 is curved or flares outwardly from the leading edge 24 to the trailing edge 33, as shown in the cross-section of FIG. 15.

In accordance with the present disclosure, a diffuser blade may include sheet metal and an undulated surface enhancement along a leading edge of the diffuser blade. The undulated surface enhancement may include a smooth, wave-like contour extending along a length of the leading edge of the diffuser blade. The undulated surface enhancement may operate to reduce a pressure drop in the air flow passing thereover, relative to traditional embodiments not having the undulated surface enhancement. That is, the undulated surface enhancement may reduce an impact of the diffuser blade on a pressure and/or velocity profile of the air flow passing through the diffuser and into the conditioned space. By improving pressure and velocity profiles relative to traditional embodiments, a power needed to operate a blower or fan that moves the air flow to and through the diffuser may be reduced. Further, in addition to reducing the pressure drop as described above, presently disclosed diffuser blades having the undulated surface enhancement along the leading edge thereof may reduce a noise caused by the air flow passing over the diffuser blade, relative to traditional embodiments, and/or caused by the fan utilized to move the air flow to and through the diffuser.

While only certain features and embodiments of the disclosure have been illustrated and described, many modifications and changes may occur to those skilled in the art, such as variations in sizes, dimensions, structures, shapes and proportions of the various elements, values of parameters including temperatures and pressures, mounting arrangements, use of materials, colors, orientations, etc., without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A round or rectangular ceiling diffuser including a blade, the blade comprising:
    a leading edge configured to face an incoming air flow and including an undulated contour extending along a closed-loop formed by the blade;
    a trailing edge opposite to the leading edge, wherein a width of the blade extends from the leading edge to the trailing edge and the undulated contour extends into and out of the width; and
    a wave shape extending along the closed-loop formed by the blade at a position along the width of the blade between the leading edge and the trailing edge, wherein the wave shape and the undulated contour comprise corresponding curvatures into and out of the width of the blade.

2. The round or rectangular ceiling diffuser of claim 1, wherein the blade comprises first, second, third, and fourth blade segments joined to form a rectangular frustum.

3. The round or rectangular ceiling diffuser of claim 1, wherein the blade comprises a conical frustum.

4. The round or rectangular ceiling diffuser of claim 1, wherein the blade comprises a circular or rectangular cross-section at a position along the width of the blade.

5. The round or rectangular ceiling diffuser of claim 1, wherein the blade comprises a curved surface extending along the width of the blade from the undulated contour to the wave shape.

6. The round or rectangular ceiling diffuser of claim 1, wherein the undulated contour comprises continuous smooth curves connected end-to-end, such that the undulated contour does not comprise a straight segment, does not comprise a sharp segment, does not comprise a jagged segment, and does not comprise a saw-like segment.

7. The round or rectangular ceiling diffuser of claim 1, wherein the blade comprises:
    an upper surface configured to guide a portion of the incoming air flow to a diffuser outlet section; and
    a lower surface opposite the upper surface and configured guide an additional portion of the incoming air flow to an additional diffuser outlet section.

8. The round or rectangular ceiling diffuser of claim 1, comprising an additional blade, the additional blade comprising:
    an additional leading edge configured to face the incoming air flow and including an additional undulated contour extending along an additional closed-loop formed by the additional blade; and
    an additional trailing edge opposite to the additional leading edge, wherein an additional width of the additional blade extends from the additional leading edge to the additional trailing edge and the additional undulated contour extends into and out of the additional width.

9. The round or rectangular ceiling diffuser of claim 1, comprising an air flow inlet disposed adjacent the leading edge of the blade and an air flow outlet disposed adjacent the trailing edge of the blade.

10. The round or rectangular ceiling diffuser of claim 9, wherein the air flow inlet is configured to be coupled to a duct or to a duct adapter.

11. The round or rectangular ceiling diffuser of claim 1, wherein the blade comprises a curved profile extending along the width of the blade.

12. A ceiling diffuser blade, comprising:
    a leading edge configured to face an incoming air flow;
    a width extending from the leading edge to a trailing edge of the ceiling diffuser blade;
    an undulated contour extending along the leading edge and into and out of the width, wherein the undulated contour comprises peaks and valleys that are joined such that the undulated contour forms a continuously smooth, wave-like curvature across the peaks and the valleys without a straight segment, without a sharp segment, without a jagged segment, and without a saw-like segment;
a closed-loop cross-section formed by the blade at a position along the width between the leading edge and the trailing edge; and
a wave shape circumscribing the ceiling diffuser blade between the leading edge and the trailing edge, wherein the wave shape and the undulated contour comprise corresponding curvatures into and out of the width of the ceiling diffuser blade.

13. The ceiling diffuser blade of claim 12, wherein the ceiling diffuser blade comprises a conical frustum and the closed-loop cross-section comprises a circular closed-loop cross-section.

14. The ceiling diffuser blade of claim 12, comprising a curved surface extending along the width of the ceiling diffuser blade from the undulated contour to the wave shape.

15. A diffuser including a closed-loop blade, the closed-loop blade comprising:
a leading edge configured to face an incoming air flow;
a trailing edge opposing the leading edge;
a width extending from the leading edge to the trailing edge;
an undulated contour extending along the leading edge and into and out of the width toward the trailing edge; and
a wave shape extending along the closed-loop blade at a position along the width of the closed-loop blade between the leading edge and the trailing edge, wherein the wave shape and the undulated contour comprise corresponding curvatures into and out of the width of the closed-loop blade.

16. The diffuser of claim 15, wherein the closed-loop blade comprises a first segment, a second segment, a third segment, and a fourth segment joined in a rectangular frustum.

17. The diffuser of claim 15, wherein the closed-loop blade comprises a conical frustum.

18. The diffuser of claim 15, wherein the closed-loop blade comprises a curved surface extending along the width of the closed-loop blade from the undulated contour to the wave shape.

19. The diffuser of claim 15, wherein the closed-loop blade comprises a curved profile extending along the width of the closed-loop blade.

20. The diffuser of claim 15, wherein the undulated contour comprises continuous smooth curves connected end-to-end, such that the undulated contour does not comprise a straight segment, does not comprise a sharp segment, does not comprise a jagged segment, and does not comprise a saw-like segment.

* * * * *